(12) United States Patent
Mann

(10) Patent No.: US 6,612,225 B1
(45) Date of Patent: Sep. 2, 2003

(54) POPPED KETTLE CORN VENDING KIOSK

(76) Inventor: Gary A. Mann, P.O. Box 1596, Cody, WY (US) 82414

( * ) Notice: Subject to any disclaimer, the term of this patent is extended or adjusted under 35 U.S.C. 154(b) by 0 days.

(21) Appl. No.: 10/384,051

(22) Filed: Mar. 10, 2003

(51) Int. Cl.[7] ............................. A23L 1/00; A23L 1/18
(52) U.S. Cl. ........................... 99/323.5; 99/357; 99/484
(58) Field of Search ...................... 99/342–344, 323.5, 99/323.6, 323.7, 323.8, 323.9, 323.11, 348, 357, 484; 126/343.5 A, 345.5 R, 25 R, 9 R; 426/93, 113, 523, 231–233

(56) References Cited

U.S. PATENT DOCUMENTS

| | | | | |
|---|---|---|---|---|
| 2,232,954 A | * | 2/1941 | Manley | 99/323.5 |
| 2,972,292 A | * | 2/1961 | Waas et al. | 99/323.5 |
| 3,648,595 A | * | 3/1972 | Morris | 99/342 |
| 4,438,682 A | * | 3/1984 | King et al. | 99/323.7 |
| 5,419,238 A | * | 5/1995 | Pinone | 99/323.6 |
| 5,662,024 A | * | 9/1997 | Cretors et al. | 99/323.7 |
| 5,690,018 A | * | 11/1997 | Hansen | 99/330 |
| 5,711,208 A | * | 1/1998 | Wood et al. | 99/323.5 |
| 5,743,172 A | * | 4/1998 | Weiss et al. | 99/323.7 |
| 5,857,403 A | * | 1/1999 | Mann | 99/323.9 |
| 6,032,572 A | * | 3/2000 | Mann | 99/323.9 |
| 6,412,395 B1 | * | 7/2002 | Weiss et al. | 99/323.7 |
| 6,453,799 B1 | * | 9/2002 | Kown | 99/286 |

* cited by examiner

Primary Examiner—Timothy F. Simone
(74) Attorney, Agent, or Firm—Charles I. Brodsky

(57) ABSTRACT

A self-contained structure for vending kettle corn popped by an electrically operated corn popper powered by a 220 volt electrical source coupled to an input receptacle on said structure.

16 Claims, 2 Drawing Sheets

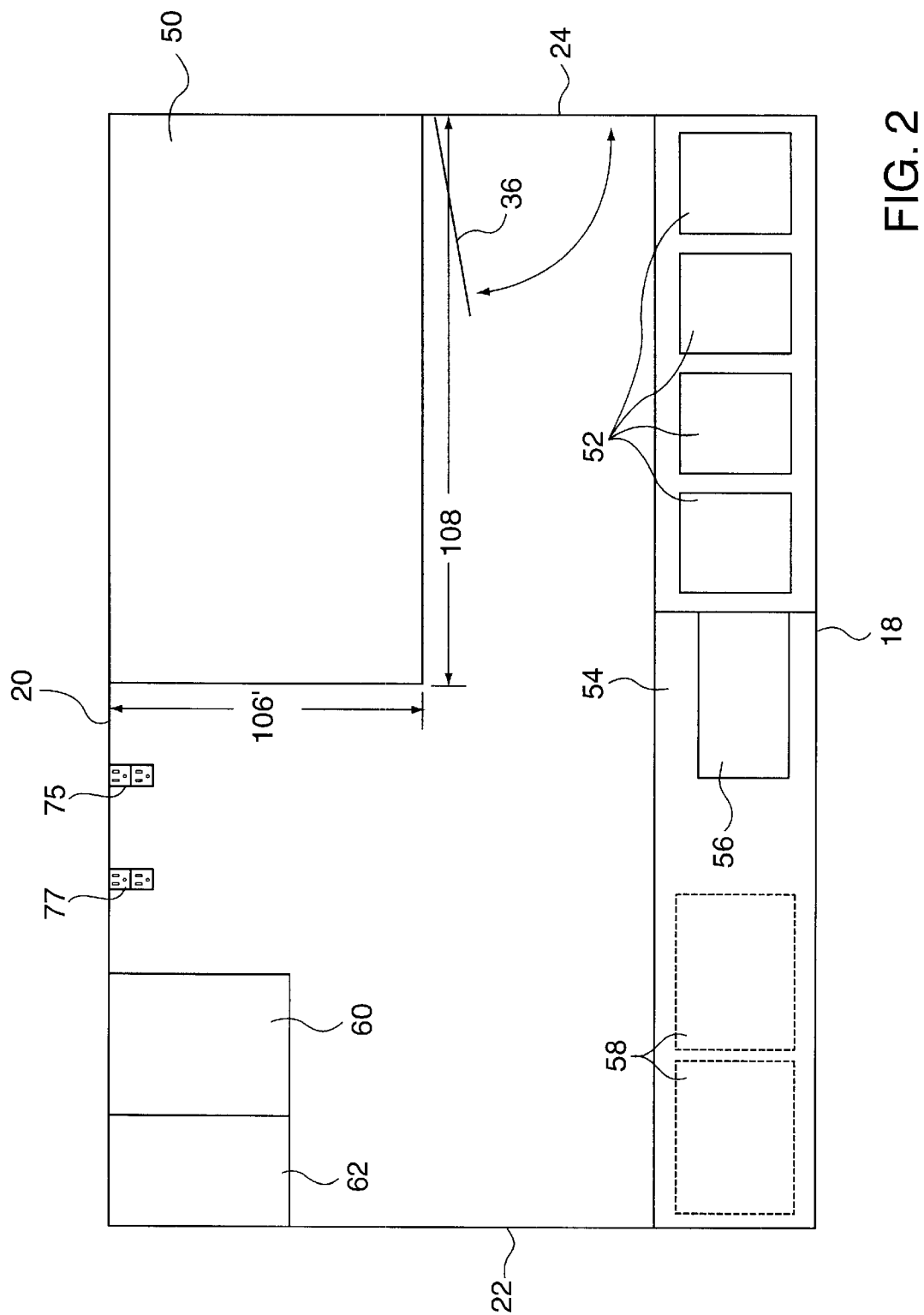

POPPED KETTLE CORN VENDING KIOSK

STATEMENT REGARDING FEDERALLY SPONSORED RESEARCH OR DEVELOPMENT

Research and development of this invention and Application have not been federally sponsored, and no rights are given under any Federal program.

CROSS-REFERENCE TO RELATED APPLICATIONS

NONE

REFERENCE TO A MICROFICHE APPENDIX

NOT APPLICABLE

BACKGROUND OF THE INVENTION

1. Field of the Invention

This invention relates to the preparation of a popped corn snack food popularly referred to as "kettle corn", in general, and to the commercial vending indoors of kettle corn, in particular.

2. Description of the Related Art

My two U.S. Pat. Nos. 5,857,403 and 6,023,572 describe a kettle corn popping structure especially useful by kettle corn vendors at such outdoor events as pioneer festivals, community commemorative events, fairs, markets, exhibitions of antiquated crafts and varieties of outdoor sports events. The corn popping apparatus there described structurally included a large popping kettle, a kettle support cabinet and a popped corn receiving-holding receptacle operable to permit the commercial vendor to prepare the popped corn, to dump the contents of its kettle into a suitable receptacle disposed outside the cabinet, and to be able to move the cabinet from one popping site to another with a substantial degree of mobility for such a relatively heavy structural combination. An improved process was also set forth to allow for producing and vending large quantities of the freshly prepared popped corn, while reducing to a minimum the hazards and discomforts which previously attended the preparation of popped corn over an open flame. The structure set out enabled the preparer to tilt the popping kettle for dumping its contents very quickly and with very little physical effort, in a manner which was practical and efficient in its use and operation, while at the same time being of a simple yet rugged construction, which could be manufactured at reasonably low cost. With the attendant savings being thus able to be passed on to a purchasing consumer, there typically began being formed long lines of the buying public to purchase the popped kettle corn at these outdoor events.

As will be understood, the kettle corn popping structures—as well as others commonly employed at such outdoor locations—typically operate from such fuels as pressurized propane, gasoline or kerosene. When utilized at indoor events, however, conversion to employ natural gas is needed instead. Because a minimum of 9–10 pounds psi is required to allow such poppers to then work efficiently, and because the poppers burn oxygen at a very high rate, the operation indoors becomes somewhat dangerous.

My pending United States patent application, Ser. No. 10/274,527, filed Oct. 21, 2002, thus covers an improved kettle corn popping structure which operates by using an electric heating unit for the corn to pop. With the popping temperature for kettle corn being typically of the order of 460° F., the electric heating unit operates from a 220 v line, in heating the oil into which the kettle corn is added, usually in amounts of 4 pounds at a time.

As will be readily appreciated by those skilled in the art, in order to operate such an electrically controlled corn popping apparatus at a designated location in a Mall or arena, such regulations as have been set by the National Safety Foundation (NSF) have to be satisfied. Even though the improved kettle corn poppers may be UL approved, National Safety Foundation regulations for restaurant equipment must be met and satisfied, as well, for the vending and dispensing of the popped kettle corn product.

SUMMARY OF THE INVENTION

As will become clear from the following description, a popped kettle corn vending kiosk according to the invention includes a structure by which the kettle corn is powered by a 220 v electrical source coupled to an input receptacle on one of its sides, with an adequate venting system to rid the area of smoke, grease, and any attendant smell. The sinks and countertops included are NSF approved, as by their manufacture being of stainless steel, within a fire-safe structure.

As will become clear, the kiosk of the invention meets these requirements in being constructed of roof and floor surfaces, and of front, rear and side walls, all of aluminum. With the floor surface resting on a plurality of wheels, and means provided for pulling the kiosk about, one, two or three such kiosks could be carried on a trailer, for example, in being taken to a Mall or arena for locating at an assigned inside location. Once rolled off and set in place, all that would be required to operate the kiosk in the vending of popped kettle corn would then be its hook-up to a 220 v power source.

Thus, in accordance with the invention, the kiosk includes a structure of such aluminum roof and floor surfaces, front, rear and side walls, and an internal electrically operated kettle corn popper. At least one openable window is provided through which the popped kettle corn is dispensed to a customer—and preferably through a foldably closable, openable window on all four sides of the structure. Access to the inside is by way of a lockable door in one of the defining walls, and air circulating means are provided above the electrical popper internal of the structure, in cooperating with an air purifying means on its roof surface overlying the air circulating apparatus. External ventilation of any smoke or smell generated is thereby effectuated, and any grease build up in operation is cleaned by the inclusion of other equipment provided to meet Health Department regulations. Such equipment may include, according to the invention:

a. Four sink compartments for the washing, rinsing and disinfecting of the various equipment, and one for simple hand washing; and b. A pair of water tanks—one, for the collection of soapy, waste water (i.e. "gray" water), and one for the replaceable storage of "fresh" water.

In addition, in fabricating the structure as a self-contained kiosk for dispensing and vending the popped kettle corn to the purchasing public, the structure of the invention also includes a hot water heater for the providing of coffee, tea or hot chocolate, a soda dispensing machine, and an ice maker for use with it. With the surfaces of the sinks and adjacent countertops all being NSF approved, an 8 feet wide, 10 feet long kiosk of substantially 7–8 feet in height could thus be had, easily transportable when resting on a plurality of wheels, and ready for operation when simply plugged into a 220 v line. All that would be required for this would be the provision of an electric input receptacle on one of the front, rear, and side walls of the kiosk—with servings to the public being available through each side where a foldably openable, shuttered window is cut.

BRIEF DESCRIPTION OF THE DRAWINGS

These and other features of the present invention will be more clearly understood from a consideration of the following description, taken in connection with the accompanying drawings, in which:

FIG. 2 is a plan view of the insides of the structure defining the kiosk construction.

DETAILED DESCRIPTION OF THE INVENTION

Figure 1:
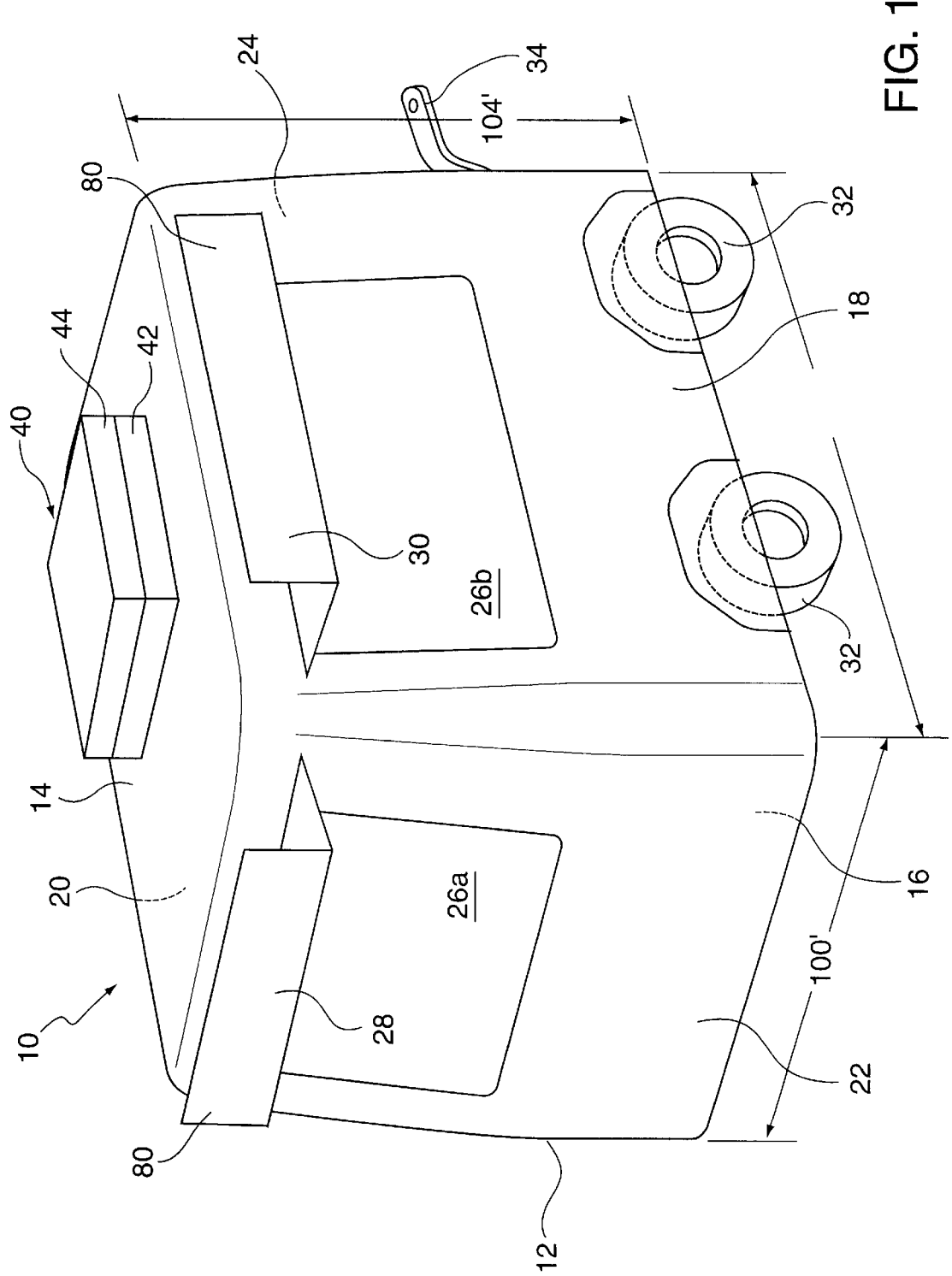
FIG. 1 is an isometric view of a popped kettle corn vending kiosk according to the invention as it might appear to an approaching customer in an enclosed Mall or arena setting.

The popped kettle corn vending kiosk of the invention 10 includes a structure 12 having roof and floor surfaces 14, 16, front and rear walls 18, 20 and a pair of opposing side walls 22, 24. At least one—and preferably four openable windows 26 are included in the walls—two of which 26a and 26b are shown open by foldable shutters 28, 30, while those located on the rear wall 20 and right side wall 24 will be understood to be shown foldably shuttered closed. The structure 12 rests on a set of wheels 32, usable in transporting the kiosk 10 from place to place by means of a vehicle coupled with a hitch 34 at the right side wall 24. As illustrated, a lockable door 36 allows access to the insides of the structure 12 by its worker(s) in an understood manner. Preferably composed of an aluminum fabrication, the roof and floor surfaces 14, 16, the front and rear walls 18, 20, and the opposing side walls 22, 24 are selected to provide a structure of a width 100 of some 8 feet, a length 102 of some 10 feet, and a height 104 of some 7–8 feet.

A venting system 40—including an air circulating means overlain by an air purifying means—is cut into the roof surface 14 of the structure 12, above the electrically powered kettle corn popping unit operating within (and preferably of the kind disclosed in my aforementioned pending Application entitled "Electrically Controlled Corn Popper Apparatus"). In the floor plan layout of FIG. 2, the electric kettle corn popper is shown at 50 adjacent to the rear wall 20—typically of a width 106 of some 3 feet and of a length of 108 some 6 feet. Adjacent the access door 36, a sink compartment 52 is shown—not only of a Health Department required 3-compartment unit for washing, rinsing and disinfecting, but also of an additional fourth compartment for hand washing, and with each sink aligned one besides the other. A countertop 54—like the sink compartment 52 being of a surface approved by the National Safety Foundation rating for restaurant equipment—overlies a hot water heater 56 of appropriate design for dispensing coffee, tea or hot chocolate to a customer. A pair of water tanks 58 are also shown—one for providing fresh water, and the other for collecting soapy, waste water. A soda machine 60 and ice maker 62 are further provided in the kiosk 10, as coupled to one of its rear or side walls 20, 22.

As the layout of FIG. 2 shows, the electrically operated corn popper 50 sits beneath the venting system 40 of FIG. 1. The electrical inlet receptacle for receiving the 220 v power line for the corn popper 50 is shown, for example, in FIG. 2 on the rear wall 20 as 75, adjacent to a second electrical inlet 77 for powering the hot water heater 56, the soda machine 60, the ice maker 62, and the air circulator 42 and air purifier 44 of the venting system 40. Folding the shutters 28, 30 open then displays any desired advertising for the kiosk 10, as at 80, and turning on the power to the corn popper, the hot water heater, the soda machine, the ice maker and the venting system readies the kiosk for use. Foldably closing the shutters 28, 30 and turning off the electrical power then readies the kiosk 10 to be trailered to a subsequent location once the electrical power lines are disconnected.

As will be seen, the result is to allow for the commercial vending indoors of kettle corn simply and easily, in a manner of just a few minutes of set-up.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. A kiosk for the vending of popped kettle corn comprising:

a structure defined by opposing floor and roof surfaces, and by front, rear, and left and right side walls;

at least one openable window in said front, rear and side walls;

an electric kettle corn popper internal of said structure;

air circulating means above said electric kettle corn popper;

air purifying means on said roof surface of said structure overlying said air circulating means and cooperating therewith;

and means on said structure receiving a source of electric power from outside said structure for operating said electric kettle corn popper within.

2. The kiosk of claim 1 wherein said last mentioned means receives a source of electric power of 220 volt input, and wherein said air circulating means, said air purifying means and said electric kettle corn popper are each operable from said 220 volt source.

3. The kiosk of claim 1 including at least one foldably shutterable window for the opening and closing thereof.

4. The kiosk of claim 1 including entry means in at least one of said front, rear and side walls for accessing the inside of said structure.

5. The kiosk of claim 1 including a pair of water tanks resting on said floor surface.

6. The kiosk of claim 5, also including a pair of freshwater and grey-water tanks internal of said structure, resting on said floor surface thereof.

7. The kiosk of claim 1 including a plurality of sink compartments resting on said floor surface.

8. The kiosk of claim 7, also including four sink compartments resting on said floor surface.

9. The kiosk of claim 1 including means resting on said floor surface for providing a source of hot water within said structure.

10. The kiosk of claim 1 including a soda dispensing machine coupled to one of said front, rear and opposing side walls of said structure.

11. The kiosk of claim 10, also including an ice making dispensing machine coupled to one of said front, rear and opposing side walls of said structure.

12. The kiosk of claim 3 wherein said structure includes four foldably shutterable windows.

13. The kiosk of claim 1 wherein said front, rear and side walls define a structure substantially 8 feet wide and 10 feet long.

14. The kiosk of claim 13 wherein said roof and floor surfaces define a structure substantially 7–8 feet tall.

15. The kiosk of claim 13 wherein said roof and floor surfaces, and said front, rear and side walls are all composed of an aluminum fabrication.

16. The kiosk of claim 13 wherein said floor surface rests upon a set of wheels, and wherein means are additionally provided coupled to one of said front, rear and side walls for pulling said structure about.

* * * * *